Sept. 3, 1963 R. J. NAMSICK 3,102,705
FLOTATION DEVICE
Filed March 28, 1960 2 Sheets-Sheet 1

INVENTOR.
RAYMOND J. NAMSICK
BY
J. B. Holden
ATTORNEY

Sept. 3, 1963 R. J. NAMSICK 3,102,705
FLOTATION DEVICE
Filed March 28, 1960 2 Sheets-Sheet 2

*INVENTOR.*
RAYMOND J. NAMSICK

BY J.B. Holden
ATTORNEY

United States Patent Office 3,102,705
Patented Sept. 3, 1963

3,102,705
FLOTATION DEVICE
Raymond J. Namsick, Akron, Ohio, assignor to The Goodyear Tire & Rubber Company, Akron, Ohio, a corporation of Ohio
Filed Mar. 28, 1960, Ser. No. 17,824
8 Claims. (Cl. 244—102)

This invention relates to a flotation device and in particular to a retractable float for vehicles.

In certain operations it is desirable to provide various types of vehicles, for example helicopters, tanks, mobile guns, and the like, with flotation devices to permit operations in water. However, in many cases it is necessary that the floats not only be capable of being retracted when not in use but also be provided with a certain degree of protection against damage in rough terrain or under gun fire during warfare. Floats constructed substantially wholly of relatively rigid heavy sections possess the obvious disadvantage that they cannot be easily expanded and contracted during normal operations. Furthermore, such floats are usually very heavy and are therefore unsuitable for use in air and similar operations. It is an object of the present invention to provide a fully retractable flotation device which can be easily adapted to a variety of vehicles. It is a further object of the present invention to provide a flotation device which when retracted presents a minimum obstacle to the normal operations of the vehicle to which it is attached. It is a still further object of the present invention to provide a flotation device which will remain relatively free from damage when required to operate in rough terrain or under fire during war time. These and other objects of the present invention will become apparent from the following description and drawings, in which:

Figure 1:
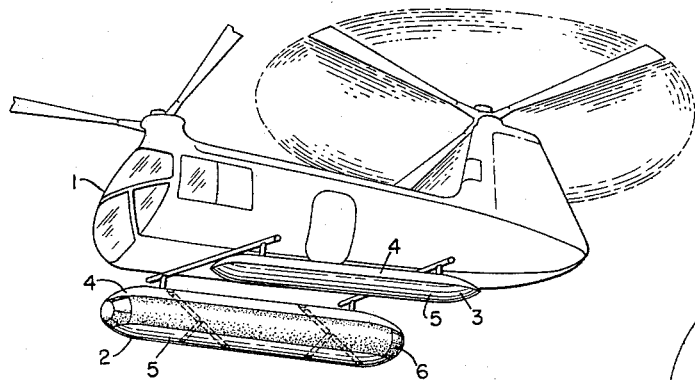
FIG. 1 illustrates a typical use of a flotation device according to the present invention.
Figure 2:
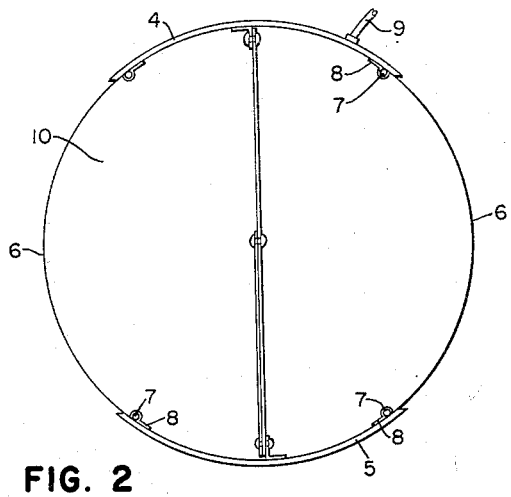
FIG. 2 is a transverse cross-section of a float such as illustrated in FIG. 1.

Referring to FIG. 1, there is illustrated a conventional helicopter 1 having attached to the underside thereof flotation devices 2 and 3 made according to the present invention. The float 2 is shown in an expanded or inflated condition for use in landing on water, while the float 3 is shown retracted or evacuated for illustrative purposes. The flotation device 2 comprises in general two relatively rigid saddle members 4 and 5, one of which is attached to the helicopter and the other of which through a means which will subsequently be described is movable relative to the other saddle. The construction of the float is shown in more detail in FIG. 2. It will be seen that the saddle members illustrated have a generally concave cross-section and are disposed in opposed relationship with each other. The saddle members 4 and 5 may be made of a variety of materials, aluminum or similar light metals being preferred. Extending between the saddle members 4 and 5 and forming therewith an inflatable flotation chamber is a flexible air impervious structure 6 which is preferably made of fabric such as nylon coated with an elastomer. A variety of elastomers may be used to provide air retention properties, the material most commonly used being neoprene rubber. While the fabric means 6 is illustrated in FIG. 2 as comprising two portions extendign between each side of the saddles 4 and 5 and connected thereto through a conventional bead 7 attached to the saddle, for example, 4 by means of a channeled retaining member 8, it is obvious that the flotation chamber could be formed by means of a cylindrical bag to which the saddles 4 and 5 are attached or adhered. In any event it is necessary, of course, that the saddle members be substantially air impervious if the elastomer-coated fabric 6 extends only from edge to edge of the saddles as illustrated in FIG. 2. There is also provided, preferably on the saddle which is mounted or attached to the vehicle, valve means 9 for inflating and evacuating the flotation chamber 10. The valve 9 may take a variety of conventional forms and need not be described in detail here. The float is preferably provided with substantially conical ends on the bag and somewhat elliptical ends on the saddles, as illustrated in FIG. 1, for hydrodynamic purposes although substantially flat ends could be used. It will be appreciated from an examination of FIG. 1 that, with saddles of the type shown, when the float is retracted not only is it fully protected but presents minimum drag during the flight of the helicopter.

Figure 3:
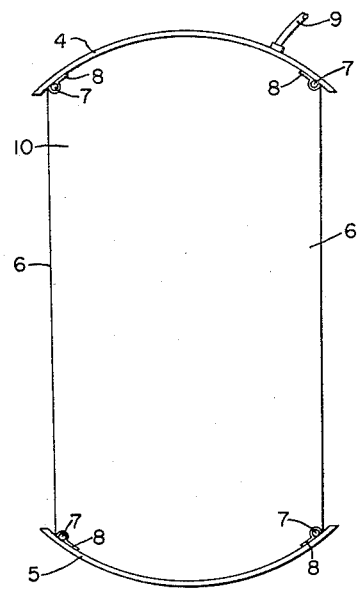
FIG. 3 is a section of the float shown in FIG. 2 at an intermediate stage of retraction.
Figure 5:
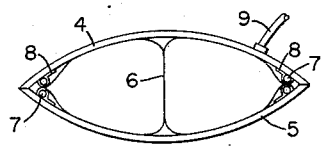
FIG. 5 is a view similar to FIG. 4 showing the device fully retracted.
Figure 4:
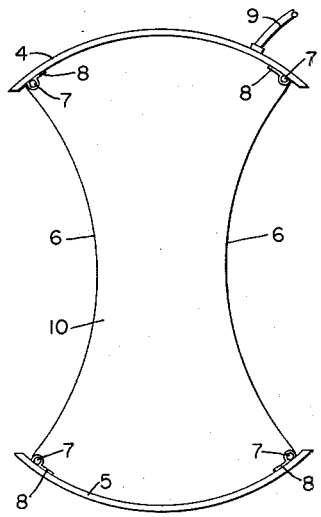
FIG. 4 is a view similar to FIG. 3 at a still further stage of retraction.

In operation when it is desired to provide flotation characteristics for a vehicle, gas pressure is transmitted through valve 9 into the float chamber 10 illustrated in FIG. 2. This causes the inflation of the chamber and the saddle 5 moves outwardly and downwardly away from saddle 4 until the chamber achieves a substantially circular cross-section at which point maximum flotation is provided. When the float is no longer required and it is desired to stow it, a partial vacuum is applied to the chamber through valve 9 to evacuate the air or other gas therefrom. The float then retracts in a series of stages illustrated in FIGS. 3 through 5. As shown in FIG. 3, as the pressure in the float chamber decreases the sides assume a substantially straight vertical position with the saddle members at maximum displacement from each other. Further evacuation of the chamber causes the flexible fabric sides and ends to bow inwardly and to draw the saddle members toward each other in the manner illustrated in FIG. 4. Further evacuation of the flotation chamber causes the fabric sides and ends to fold inwardly and up against the interior portions of the saddle members as shown in FIG. 5 where the float is in the completely retracted position. Actual experiments with a float of this design have shown that evacuation of the chamber with a common household vacuum cleaner not only retracts the float completely but will result in the flattening of the saddle members if evacuation is continued beyond the point at which the saddles contact each other. Further, it has been found that to provide for full stowage of the fabric means and to avoid straining the fabric to the point which might result in rupture during retraction, it is requisite that the total developed cross-sectional length of the saddles be at least half and preferably slightly more than half of the total developed cross-sectional length of the flotation chamber. As will be clear as the present description proceeds, this condition may be achieved in a variety of manners by various modifications of the saddle members.

Figure 7:
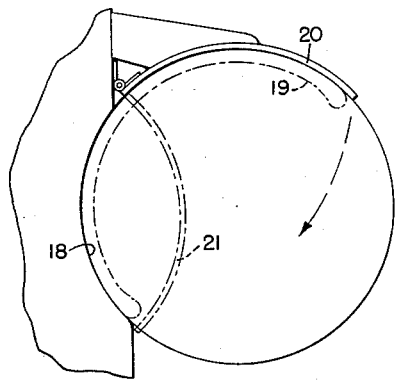
FIG. 7 is a view showing the method of retraction and stowage of the float of FIG. 6.
Figure 6:
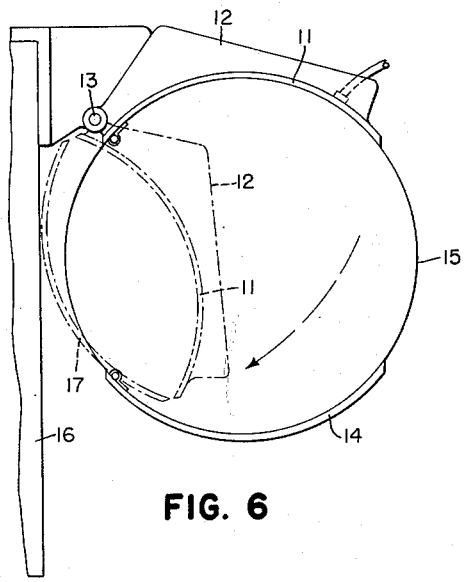
FIG. 6 is a transverse cross-sectional view of another form of float which may be used with a variety of vehicles.

FIG. 6 illustrates a different form of a flotation device made according to the present invention. In the device of FIG. 6 one of the saddle members 11 is attached to the side of a vehicle through the use of web 12 and a hinge 13 while the other saddle member 14 is freely suspended by the fabric bag 15. The flotation chamber is evacuated in the manner previously described at which time saddle 14 moves up toward and into contact with saddle 11 and the fabric bag is stowed between the two saddles in the manner shown in FIG. 5. Upon completion of evacuation of the float, the entire assembly may then be dropped against the side of the vehicle 16 in the position shown by the dotted lines 17. In this fashion not only is the float fully retracted but if used on a military vehicle is provided with a measure of armor protection. FIG. 7 illustrates a further modification of the device somewhat similar in nature to that illustrated in FIG. 6 except that one of the saddle members is actually a structural portion of the vehicle, such as the concave side 18, while the other saddle member is hingedly attached to the vehicle side in a fashion similar to that shown in FIG. 6. Upon evaluation of the float the bag assumes the position illustrated by the dotted line 19 and subsequently the hinged saddle member 20 may be dropped in the position illustrated by the dotted section 21. It will be appreciated that the arrangement shown in FIG. 7 provides a flotation device which when retracted presents minimum interference with the float characteristics along the side of the vehicle to which it is attached.

Where it is desirable, an additional measure of control over the positioning of the saddles relative to each other during retraction may be obtained through the use of aligning devices inside the flotation chamber such as the angle cross members pivotally attached to the saddles as illustrated in FIG. 1.

Figure 8:
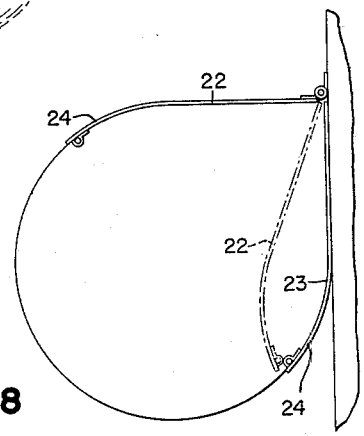
FIG. 8 is a sectional view of still another form of float illustrating a principle of retraction.

FIG. 8 illustrates a further modification of the device in which the saddles 22 and 23 are substantially flat in transverse section but terminate in an arcuate portion such as at 24. Such an arrangement provides ample stowage space for the fabric portion of the float while at the same time reducing the width of the retracted float and hence reducing the drag due to the exposed externally mounted float.

Figure 9:
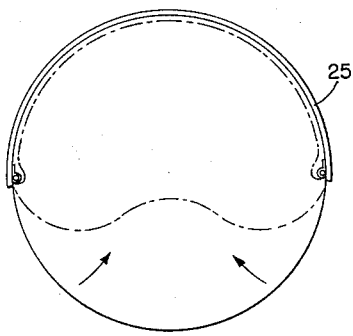
FIGS. 9 and 10 are cross-sectional views of further modifications of the float.
Figure 10:
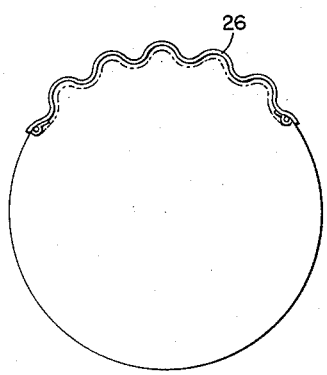

FIGS. 9 and 10 illustrate the point previously made, that in order to provide full retraction of the float and yet to avoid strains on the relatively fragile fabric structure utilized, it is necessary that the saddles have a total developed cross-sectional length which is at least half the total developed cross-sectional length of the inflated float. It will be appreciated, of course, that the saddle 25 may be substantially concave as illustrated in FIG. 9 or that the transverse span of the saddle may be reduced while maintaining the requisite developed cross-sectional length through the use of a corrugated saddle member 26 such as shown in FIG. 10.

While certain representative embodiments and details have been shown for the purpose of illustrating the invention, it will be apparent to those skilled in this art that various changes and modifications may be made therein without departing from the spirit or scope of the invention.

I claim:

1. A retractable device useful for vehicle flotation comprising, in combination, a pair of substantially rigid opposed saddle members disposed in relatively movable relationship with each other, flexible substantially air impervious means joined to said saddle members and forming therewith an inflatable vehicle supporting flotation chamber the total cross-sectional developed length of said members being at least one-half the total cross-sectional length of the inflated chamber, and means to inflate and evacuate said chamber, upon inflation of said chamber said saddle members moving away from each other under the force of inflation to extend said flexible means and form therewith an operative float and upon evacuation of said chamber said saddle members advancing toward and into contact with each other under the force of evacuation with said flexible means in substantially collapsed condition between said saddle members.

2. A device as claimed in claim 1 in which one of said saddle members is a structural part of the vehicle to be floated.

3. A device as claimed in claim 1 in which said flexible air impervious means is made of elastomer-coated fabric.

4. A device as claimed in claim 1 in which said saddle members are disposed adjacent each other along one margin thereof in hingeably movable relationship.

5. A retractable device useful for vehicle flotation comprising, in combination, a pair of substantially rigid opposed saddle members disposed in relatively movable relationship with each other, said saddle members being substantially arcuate in cross-section along the length thereof and disposed with the concave portion in opposable relationship, flexible substantially air impervious means joined to said saddle members along the margins thereof and forming therewith an inflatable vehicle supporting flotation chamber the total cross-sectional developed length of said members being at least one-half the total cross-sectional length of the inflated chamber, and means to inflate and evacuate said chamber, upon inflation of said chamber said saddle members moving apart under the force of inflation to extend said flexible means and form an operative float and upon evacuation of said chamber said saddle members advancing toward and into contact with each other under the force of evacuation with said flexible means in substantially collapsed condition between said saddle members.

6. A device as claimed in claim 5 in which one of said saddle members is a structural part of the vehicle to be floated.

7. A device as claimed in claim 5 in which said flexible air impervious means is made of elastomer-coated fabric.

8. A device as claimed in claim 5 in which said saddle members are disposed adjacent each other along one margin thereof in hingeably movable relationship.

References Cited in the file of this patent

UNITED STATES PATENTS

| | | |
|---|---|---|
| 2,306,269 | King | Dec. 22, 1942 |
| 2,463,351 | Bowers | Mar. 1, 1949 |
| 2,494,445 | Moeller | Jan. 10, 1950 |
| 2,670,159 | Barr | Feb. 23, 1954 |
| 3,004,737 | Boyle | Oct. 17, 1961 |